US009500540B2

(12) United States Patent  
Gao et al.

(10) Patent No.: US 9,500,540 B2  
(45) Date of Patent: Nov. 22, 2016

(54) METHODS AND APPARATUS FOR MONITORING MICROROLLING PROCESSES USING EMBEDDED SENSING

(71) Applicant: University of Connecticut, Farmington, CT (US)

(72) Inventors: Robert X. Gao, Manchester, CT (US); Zhaoyan Fan, Willimantic, CT (US); Jian Cao, Wilmette, IL (US)

(73) Assignee: University of Connecticut, Framington, CT (US)

( * ) Notice: Subject to any disclaimer, the term of this patent is extended or adjusted under 35 U.S.C. 154(b) by 127 days.

(21) Appl. No.: 14/214,058

(22) Filed: Mar. 14, 2014

(65) Prior Publication Data

US 2014/0260680 A1    Sep. 18, 2014

Related U.S. Application Data

(60) Provisional application No. 61/789,638, filed on Mar. 15, 2013.

(51) Int. Cl.
    *G01L 1/14*    (2006.01)
    *G01L 5/00*    (2006.01)

(52) U.S. Cl.
    CPC ............ *G01L 1/146* (2013.01); *G01L 5/0076* (2013.01)

(58) Field of Classification Search
    CPC .... G01L 1/142; G01L 5/0085; G01L 5/0014
    See application file for complete search history.

(56) References Cited

U.S. PATENT DOCUMENTS

| | | | | | |
|---|---|---|---|---|---|
| 3,423,993 | A | * | 1/1969 | Lynnworth | G01N 29/2493 310/335 |
| 3,541,840 | A | * | 11/1970 | Phelan | G01N 29/2493 73/639 |
| 3,612,920 | A | * | 10/1971 | Bantz | G10K 11/004 310/336 |
| 3,771,354 | A | * | 11/1973 | Miller | G01N 29/2437 73/625 |

(Continued)

OTHER PUBLICATIONS

Altintas, Y. and Park, S.S., "Dynamic Compensation of Spindle-Integrated Force Sensors," CIRP Annals—Manufacturing Technology, vol. 53, No. 1, pp. 305-308, 2004.

(Continued)

*Primary Examiner* — Lisa Caputo  
*Assistant Examiner* — Tran M Tran  
(74) *Attorney, Agent, or Firm* — Hamilton, Brook, Smith & Reynolds, P.C.

(57) ABSTRACT

A method of determining a spatial and temporal pressure distribution profile on an outer surface of a rotating apparatus includes producing one or more pressure indications in response to pressure applied to the outer surface of the rotating apparatus. The producing is carried out by a transducer assembly embedded within the rotating apparatus at a distance d from the outer surface of the rotating apparatus. The method further includes sampling, by an acquisition assembly, the one or more pressure indications from the transducer assembly and storing the sampled one or more pressure indications. The method also includes processing the one or more pressure indications to produce the pressure distribution profile describing the pressure applied to the outer surface.

20 Claims, 7 Drawing Sheets

(56) References Cited

U.S. PATENT DOCUMENTS

| | | | | | |
|---|---|---|---|---|---|
| 4,063,153 | A | * | 12/1977 | Dechene | G01N 27/226 324/434 |
| 4,175,428 | A | * | 11/1979 | Eilersen | G01L 1/142 361/283.3 |
| 4,552,028 | A | * | 11/1985 | Burckhardt | G01L 5/165 361/283.1 |
| 4,779,960 | A | * | 10/1988 | Kozaki | C09K 19/42 349/124 |
| 5,010,775 | A | * | 4/1991 | Choisnet | G01B 7/22 73/780 |
| 5,017,879 | A | * | 5/1991 | Lucas | G01N 27/226 324/663 |
| 5,291,791 | A | * | 3/1994 | Lucas | G01N 27/226 73/861.04 |
| 7,213,459 | B2 | * | 5/2007 | Sengupta | G01N 29/043 73/636 |
| 7,490,793 | B2 | * | 2/2009 | Mackness | B60C 23/0408 244/100 R |
| 8,311,751 | B2 | * | 11/2012 | Turk | G01L 5/0014 702/56 |
| 8,659,307 | B2 | * | 2/2014 | Eriksen | B64D 29/06 324/690 |
| 8,933,713 | B2 | * | 1/2015 | Eriksen | B64C 25/001 324/686 |
| 8,997,590 | B2 | * | 4/2015 | Oberdoerfer | G01N 29/223 310/326 |
| 2012/0272518 | A1 | * | 11/2012 | Cui | G01L 5/165 29/825 |

OTHER PUBLICATIONS

Groche, P., et al., "Incremental Bulk Metal Forming," CIRP Annals—Manufacturing Technology vol. 56, No. 2, pp. 635-656, 2007.

Jeswiet, J., et al. "Forming Parameters for Incremental Forming of Aluminum Alloy Sheet Metal," Journal of Engineering Manufacture, vol. 216, No. 1, pp. 1367-1371, Oct. 1, 2002.

Nyahumwa, C. and Jeswiet, J., "A Friction Sensor for Sheet-Metal Rolling," CIRP Annals—Manufacturing Technology, vol. 40, No. 1, pp. 231-233, 1991.

Tlusty, J. and Andrews, G.C., "A Critical Review of Sensors for Unmanned Machining," CIRP Annals—Manufacturing Technology, vol. 32, No. 2, pp. 563-572, 1983.

Zhou, R., et al., "An Investigation on Deformation-based Micro Surface Texturing," ASME Journal of Manufacturing Science and Engineering, vol. 133, No. 6, Dec. 2011.

Fan, Z., et al., "Pressure Reconstruction for Microrolling Process Monitoring", SciVerse ScienceDirect, 46th CIRP Conference on Manufacturing Systems 2013.

Ng, Man-Kwan, et al., "Characterization of Electrically-Assisted Micro-Rolling for Surface Texturing Using Embedded Sensor", CIRP Annals Manufacturing Technology.

Fan, Z., et al, "Real-time monitoring of pressure distribution in microrolling through embedded capacitive sensing", CIRP Annals—Manufacturing Technology, vol. 61(1):367-370, 2012.

* cited by examiner

METHODS AND APPARATUS FOR MONITORING MICROROLLING PROCESSES USING EMBEDDED SENSING

RELATED APPLICATION(S)

This application claims the benefit of U.S. Provisional Application No. 61/789,638, filed on Mar. 15, 2013, the entire teachings of which are incorporated herein by reference.

GOVERNMENT SUPPORT

This invention was made with government support under CMMI 1100507 and CMMI-1100787 from National Science Foundation. The government has certain rights in the invention.

BACKGROUND OF THE INVENTION

In-situ measurement of manufacturing process parameters has been developing in recent years. While details of designs may vary, depending on the need of the specific applications, the central idea of the various design is to integrate structurally a sensing element of a certain shape, such as a pin, cone, or wedge, onto a tool-interface such that the sensing element is in contact with metallic or other material being processed. Prior designs are applicable to a conventional rolling process, for example, where rolls in a conventional rolling process have diameters in the range of 600 to 1,400 mm.

In contrast, a micro-rolling process involves forming rolls with diameters in the range of 28 to 66 mm. The more than ten-fold decrease in the diameter of the roll leads to a drastic decrease in volume available for sensor and sensing element integration, and precludes the employment of certain sensing techniques, such as those used in conventional rolling processes. In addition, high accuracy demanded for microrolling prohibits use of conventional sensors that require contact with a workpiece, such as sheet metal, as any contact reduces dimensional accuracy of a product produced from the workpiece and may even damage a formed texture on the product.

SUMMARY OF THE INVENTION

Disclosed herein is an embedded sensing system and method, and related apparatus, that is able to measure continuously spatial and temporal variations of pressure distribution on a rotating surface of a machine tool, such as a rolling machine, in real-time. The rolling machine has a forming roll (also referred to herein as a "roll" or "roller" or "forming roller") that applies pressure to a work piece, either against a stationary table or against a second forming roll.

In one embodiment, the sensing system includes three major components: 1) a cylindrical sensing rod that has a series of electrode segments on its surface to form a series of capacitors, wherein the sensing rod is inserted into a forming roll along an axial direction and measures capacitance values proportional to deformation of the forming roll between the sensing rod and a surface of the forming roll; 2) a capacitance measuring circuit designed to reduce or eliminate an effect of stray capacitance; and 3) a pressure retrieval method to reconstruct the pressure distribution profile that is across the forming roll from the measured capacitance data.

An embodiment of a design disclosed herein enables continuous pressure measurement without the sensor, or transducer thereof, being in direct contact with the workpiece (e.g., sheet metal), thus avoiding interference with or from the surface texture on the workpiece. The embodiment of the design disclosed avoids leaving a sensor footprint on the surface of a product, such as a formed micro-textured surface. The continuous pressure measurement takes place across the entire length of the forming roll instead of only at discrete locations and, thereby, provides more comprehensive capture of data of physical deformation that occurs during micro-rolling processes.

In one aspect, the described embodiments include an apparatus configured to rotate. The apparatus includes a geometric shape disposed about a first longitudinal axis. The geometric shape has a first end, a second end, and an outer surface at a radius r from the longitudinal axis. The geometric shape defines at least one void therein, the at least one void disposed along a second longitudinal axis substantially parallel to the first longitudinal axis. The at least one void does not intersect the outer surface. The apparatus further includes a transducer assembly disposed within the at least one void. The transducer assembly includes at least one transducer element constructed and arranged to produce an indication corresponding to pressure applied to the outer surface of the geometric shape.

In one embodiment, the geometric shape is substantially cylindrical. In another embodiment, the at least one transducer element includes a capacitive transducer having a first conductor and a second conductor. Another embodiment includes a dielectric material disposed between the first conductor and the second conductor. The distance between the first conductor and the second conductor changes in response to pressure applied to the outer surface.

The outer surface includes a plurality of sections from the first end to the second end, each section including a corresponding transducer element, the plurality of sections being used to produce a spatial and temporal pressure distribution profile. The transducer assembly further includes a transmitter configured to convey the indication from the apparatus. The transmitter may be a wireless transmitter, although the transmitter may use a medium known in the art for conveying electrical signals from a rotating platform, e.g., slip rings or commutator assemblies.

In another aspect, the described embodiments include a system for measuring pressure experienced by a rotating apparatus. The system includes a roller disposed about a first longitudinal axis. The roller has a first end and a second end, and an outer surface at a radius r from the longitudinal axis. The roller defines at least one void therein. The at least one void is disposed at a distance d from the outer surface and along a second longitudinal axis substantially parallel to the first longitudinal axis. The system further includes a transducer assembly disposed within the at least one void, the transducer assembly includes at least one transducer element constructed and arranged to produce an indication corresponding to pressure applied to the outer surface of the roller. The system also includes a data acquisition module constructed and arranged to receive the indication from the at least one transducer element and to transform the indication into a value corresponding to pressure applied to the outer surface.

In one embodiment, the at least one transducer element includes a capacitive sensor having a first conductor and a second conductor. The indication is a capacitance, the data acquisition module converts the capacitance to a voltage, and the data acquisition module samples the voltage to produce the indication.

In another embodiment, the transducer assembly further includes a wireless transmitter configured to transmit the indication from the apparatus. The data acquisition module provides an excitation signal to the one or more transducer elements to determine a characteristic of the one or more transducer elements. In one embodiment, the characteristic is a capacitance value.

In another embodiment, the outer surface consists of a plurality of sections from the first end to the second end. Each section has a corresponding sensor element. The data acquisition module uses back-projection to transform the indication into a spatial and temporal pressure distribution profile corresponding to pressure applied to the outer surface from the first end to the second end.

In another aspect, the described embodiments include a method of determining a spatial and temporal pressure distribution profile on an outer surface of a rotating apparatus. The method includes producing, by a transducer assembly embedded within the rotating apparatus at a distance d from the outer surface of the rotating apparatus, one or more pressure indications in response to pressure applied to the outer surface of the rotating apparatus. The method further includes sampling, by an acquisition assembly, the one or more pressure indications from the transducer assembly and storing the sampled one or more pressure indications. The method also includes processing the one or more pressure indications to produce the pressure distribution profile describing the pressure applied to the outer surface.

In one embodiment, the processing further includes back-projecting the one or more pressure indications to calculate the pressure distribution profile. Another embodiment further includes converting the one or more pressure indications into an alternative physical parameter, for example converting capacitance into a voltage. In another embodiment, the acquisition assembly is collocated with the rotating apparatus.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Disclosed herein is a non-contact sensing method, and related apparatus including for example sensors, transducers, sampling circuits, data acquisition devices, processors and associated instructions for data processing, for measuring spatial and temporal pressure distribution across the rotating surface of a machine tool, without directly contacting the workpiece. Also disclosed herein is a technique for in-situ quantification of the pressure distribution using computational methods. Also disclosed herein is technique for wireless transmission of the measured data from sensors out of the rotating roll to an external data receiver.

Figure 1:
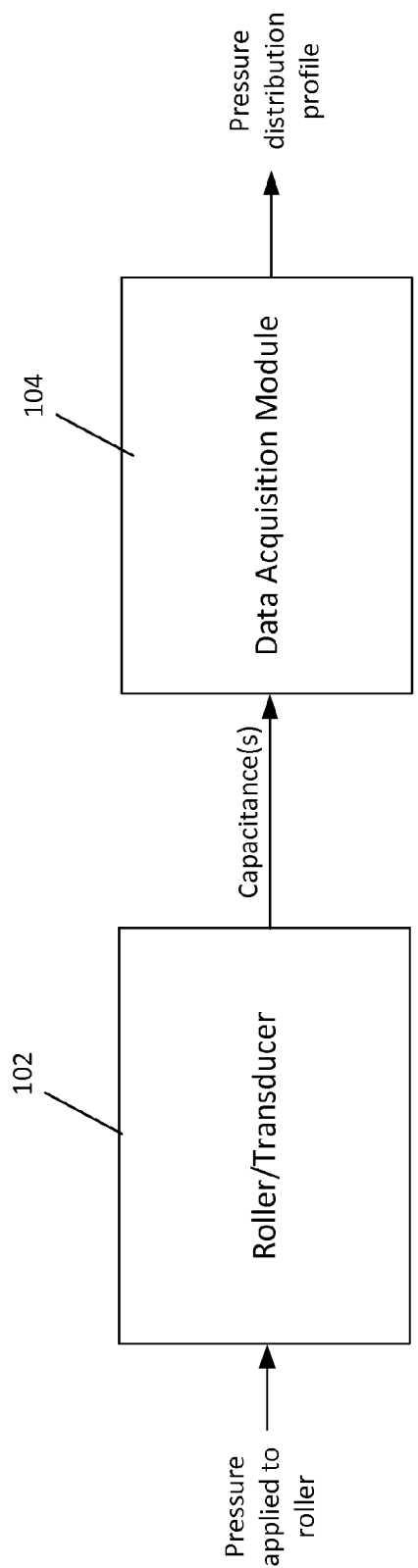
FIG. 1 is a block diagram of an example embodiment of the present invention.

FIG. 1 illustrates an example block diagram of the described embodiments, including a roller/transducer 102 and a data acquisition module 104. The roller/transducer 102, described in more detail below, includes a roller device that is used to apply pressure to a workpiece, and a transducer embedded within the roller that enables a measurement of pressure applied at the rotating surface of the roller without the transducers directly contacting the workpiece. The transducer produces an indication corresponding to the pressure applied to the roller. In this example embodiment, the indication of pressure is capacitance, but, in other embodiments, the indication may be some other parameter, such as DC voltage, frequency or AC signal amplitude.

The data acquisition module 104 receives the indication of pressure (in this case, capacitance) and may perform a number of types of processing to produce a pressure distribution profile that describes, spatially and temporally, the pressure applied to the roller.

Figures 2A, 2B:
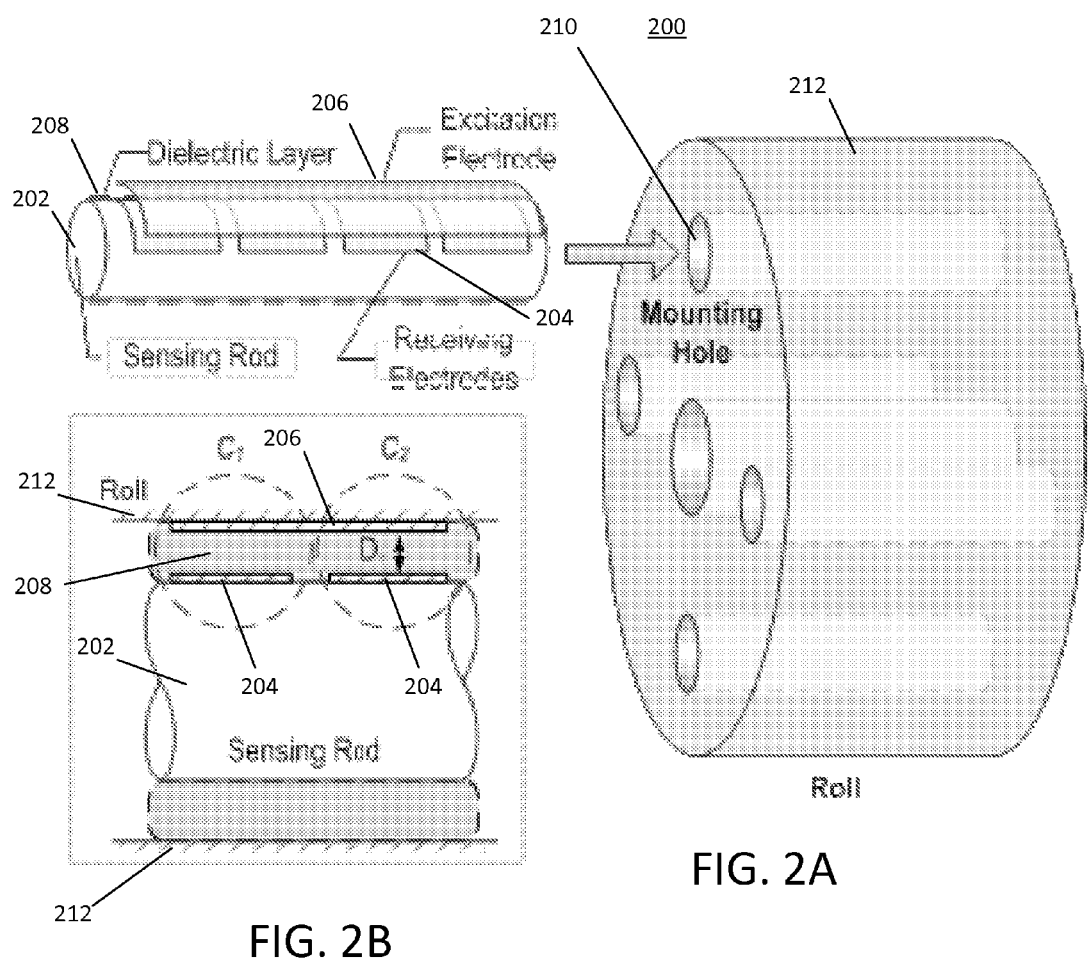
FIG. 2A is a mechanical diagram of an example embodiment of the disclosed roller/transducer according to example embodiments.
FIG. 2B is a sectional view of the roll and the sensor.

FIG. 2A shows an example embodiment of the disclosed roller/transducer 200 that includes a sensing rod 202 and a series of electrodes (receiving electrodes 204) installed on the surface of the sensing rod 202. The electrodes may also be referred to as "conductors" herein. FIG. 2B shows a sectional view of the roll 212 and sensing rod with electrodes 204, 206 and dielectric 208. In one embodiment, the sensing rod may be a ceramic material, although other embodiments may use a sensing rod made of other materials.

Another electrode, called an excitation electrode 206, is installed along the inner surface of the sensor mounting hole 210, which is a void in the roll 212 drilled along the axial direction of the roll 212. The excitation and receiving electrodes are separated by a layer of plastic film 208 or other dielectric material coated on the receiving electrodes. As a result, when the sensing rod 202 is inserted into the mounting hole, a series of capacitors C1, C2, ..., CN are formed along the surface of the sensing rod 202.

During the rolling process, when the sensing rod 202 passes the contact zone between the roll 212 and the workpiece, the pressure applied across the roll surface microscopically deforms the roll. Consequently, the dielectric layer thickness, Di, between the excitation and receiving electrodes may change. The change in distance Di at each specific $i^{th}$ receiving electrode may vary, depending on the stiffness of the dielectric layer, the roll, and the sensing rod.

Such a deformation of the dielectric layer thickness may result in a change in the capacitance value Ci, expressed as:

$$C_i = \epsilon_0 \epsilon_r A/D_i c_i = \epsilon_0 \epsilon_r A/D_i \quad (1)$$

where $\epsilon_0$ and $\epsilon_r$ are the permittivity of vacuum and relative permittivity of the dielectric material (e.g., plastic), respectively, and A is the area of the excitation electrode. As a result, the measured capacitance value can be expressed as a function of the spatial pressure distribution on the roll surface. An increase in the pressure causes an associated capacitance increase, and vice versa. The sensing rod 202, receiving electrodes 204, excitation electrodes 106 and dielectric material 208 thus form a transducer assembly that interprets pressure variations applied to the roll surface as an electrical characteristic, i.e., as corresponding variations in capacitance in this embodiment.

By repeating this approach and embedding multiple sensors along the circumference of the roll 112, a two-dimensional pressure map for a processed workpiece can be established.

Figure 3:
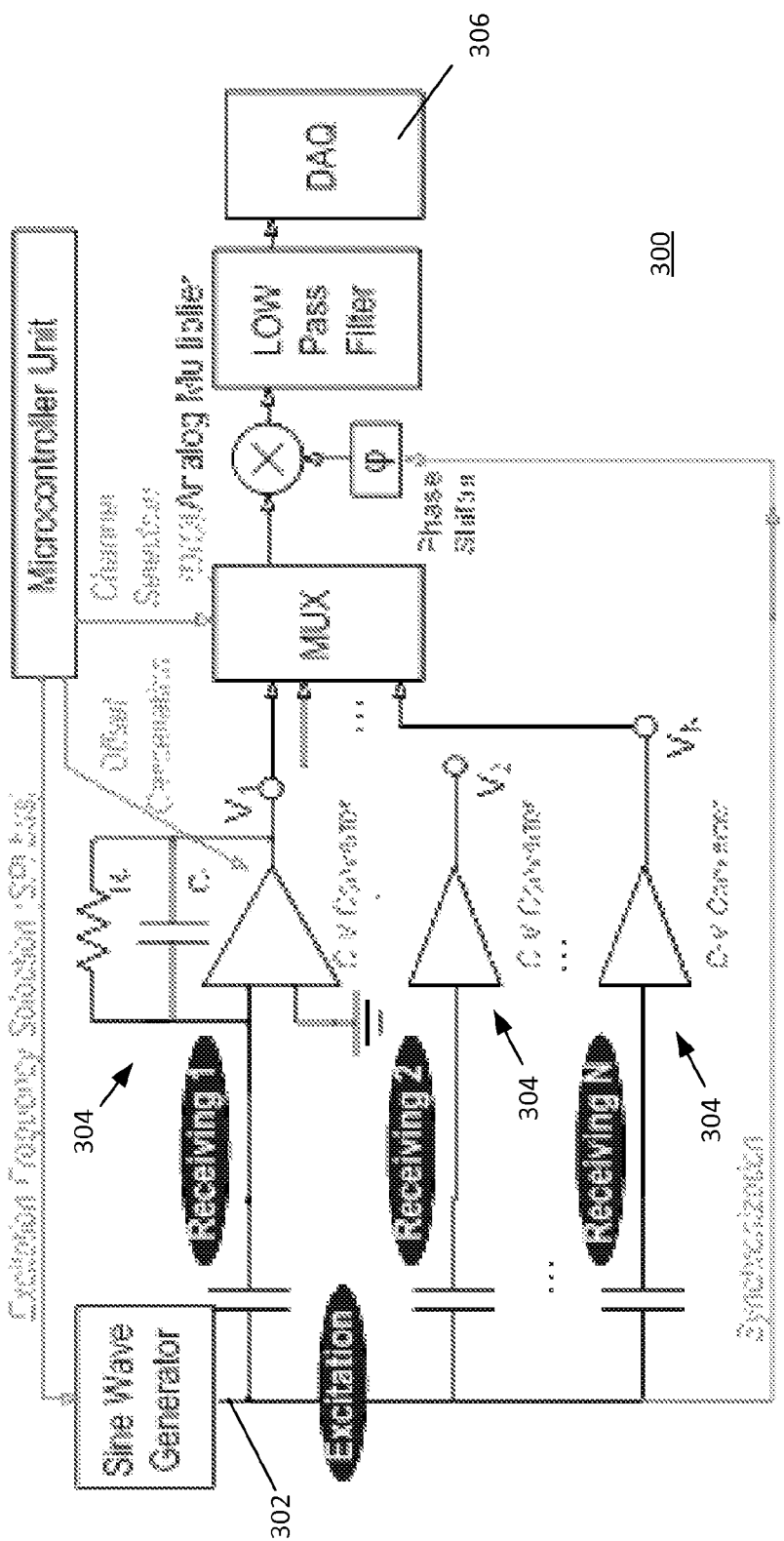
FIG. 3 is an electrical schematic diagram of a measurement circuit according to the described embodiments.

A measurement circuit 300 may convert received pressure indications to an alternative physical parameter. In this example embodiment, the measurement circuit 300 converts a pressure-induced capacitance change into a corresponding voltage, as shown in FIG. 3. The measurement circuit 300 applies an excitation signal 302 to the excitation electrode. In the example embodiment, the excitation signal 302 is a sinusoidal signal. On the receiving electrodes, the current coupled through the capacitors is amplified and converted into a series of voltage signals by means of a series of capacitance to voltage (C-V) converters 304, with the amplitude of the output signal being a function of the capacitance value Ci. If the frequency of the excitation sinewave is denoted by f, the relationship can be expressed as:

$$V_i = \frac{j \cdot 2\pi f C_i R_f}{1 + j \cdot 2\pi f C_f R_f} V \quad V_i = -\frac{j \cdot 2\pi f C_i R_f}{1 + j \cdot 2\pi f C_f R_f} \quad (2)$$

where V is the amplitude of the excitation signal, and $R_f$ and $C_f$ are the feedback resistance and capacitance of the C-V converter, respectively. The sinusoidal signals are mixed and passed through a series of lock-in amplifiers that track the received signals according to the excitation frequency, f, during which each of the AC signal amplitudes $V_i$ is converted to a proportional DC level that is subsequently read via a data acquisition (DAQ) card 306 into a computer. By inverting the calculation in Eq. (2), $C_i$ can be calculated from the measured $V_i$ in sequence, which is controlled by a microcontroller. To avoid shorting of the C-V converters, a multiplexer (MUX) polls the receiving signals from different receiving electrodes before they are processed by the lock-in amplifiers.

Information gathered by the DAQ 306 is processed using techniques such as back projection and other interpolation techniques, as set forth in detail below. This post-DAQ processing results in reconstructed pressure distribution information that is transmitted from the roll 112 by a transmitter, either wirelessly or by other techniques known in the art for conveying information from a rotating structure. The transmitter may transmit the information using strong electrical current pulses or other techniques available in the art for wirelessly transmitting information (e.g., Bluetooth, WiFi, inductively, etc.).

Figure 4:
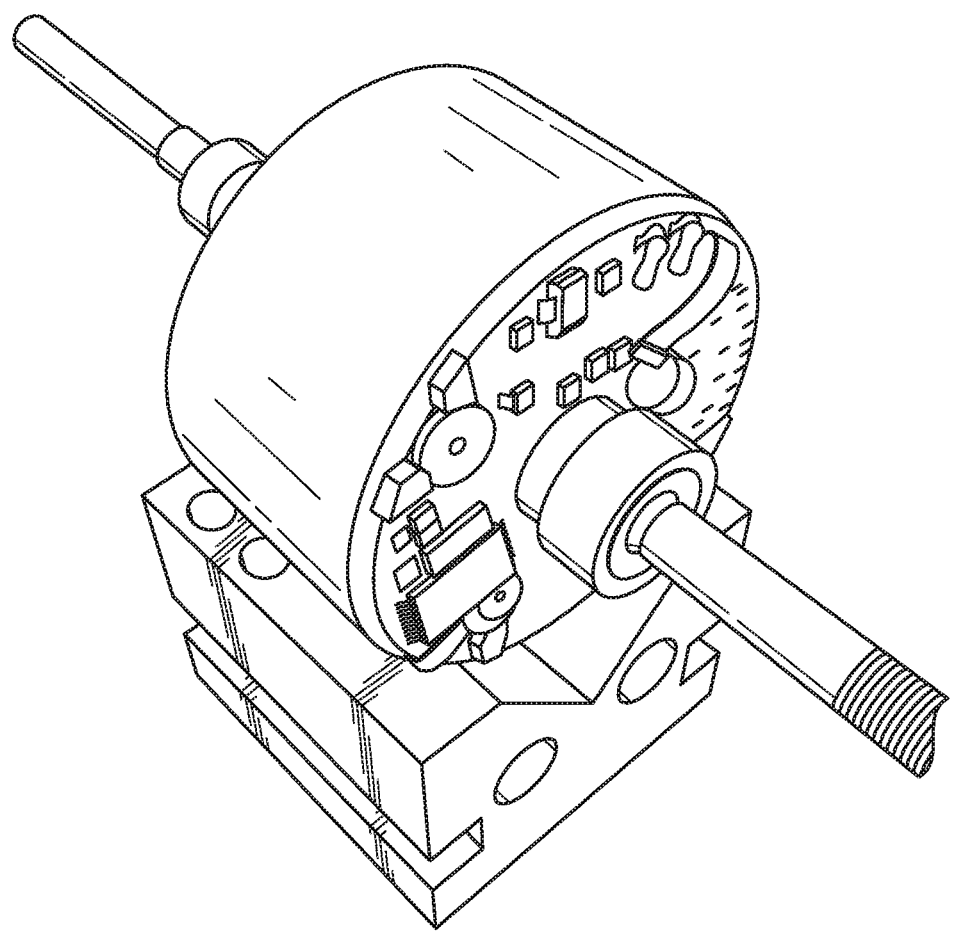
FIG. 4 is a photograph of an example of a roller/transducer according to the described embodiments with data sampling and acquisition components collocated.

In some embodiments, the processing described above (and shown in example FIG. 3), along with the subsequent processing described below, is performed locally at the roll 112. In one embodiment, the components necessary to perform the processing may be arranged within the roll or on the sides of the roll 112, for example as shown in FIG. 4. In other embodiments, some of the processing may take place at a location remote from the roll 112. For example, in one embodiment, the raw capacitance values Ci may be transmitted from the roll 112 to be converted to a voltage, sampled with a DAQ and reconstructed into a pressure profile on a computer workstation remote from the roll 112. In another embodiment, only the functionality up to the DAQ 306 may be local to the roll 112, with the information to be gathered by the DAQ 306 transmitted from the roll 112 to a remote location where the DAQ 306 and post-DAQ processing resides.

To reconstruct the pressure distribution from the measured capacitance values, a quantitative relationship between the pressure and the capacitance is established. Considering the complexity of the roll geometry, a numerical solution may be developed. Given that the deformation of the roll is much smaller than the dimension of the roll structure, it can be assumed that each of the measured capacitance values, Ci, (i=1, 2, ... N), is a linear function of the pressure applied on the roll surface, Pj, (j=1, 2, ... M), as shown in FIG. 3.

Such a relationship between Ci and Pj can be expressed as:

$$\lambda = Sp \cdot \lambda = s \cdot p \quad (3)$$

where S is the Jacobian matrix of $\lambda$ vs. p, and p=[P1, P2, ... PM] is the normalized pressure.

Equation (3) manifests the "forward" problem, where $\lambda = [\lambda 1, \lambda 2, ..., \lambda N]$ is the capacitance vector. Each $\lambda$ component is normalized by the sum of all the capacitance values measured under full load, CiF, when P1=P2= ... = PM=1, and those measured at zero load state, CiZ, when P1=P2= ... =PM=0, following the expression that $\lambda i$=(Ci−CiZ)/(CiF−CiZ). Considering S as the linear mapping from the permittivity vector space onto the capacitance vector space, $S^T$ can be considered as mapping in the reversed direction, from capacitance to permittivity. The approximate solution for p is thus given as:

$$\hat{p} = S^T \cdot \lambda \quad (4)$$

To minimize error caused by $S^T$, regularization methods, such as Tikhonov regularization, have been investigated for solving of ill-posed inverse problems (Z. Fan, et al., "Real-Time Monitoring of Pressure Distribution in Microrolling through Embedded Capacitive Sensing," *CIRP Annals—Manufacturing Technology*, Vol. 61, No. 1, pp. 367-370, 2012). The general form of the Tikhonov regularization for solving the pressure distribution in Eq. (3) is given by:

$$\min\left(\frac{1}{2}\|Sp - \lambda\|^2 + \alpha\|I(p - \hat{p})\|^2\right)\min\left(\frac{1}{2}\|Sp - \lambda\|^2 + \alpha\|I(p - \hat{p})\|^2\right) \quad (5)$$

Where $\hat{p}$ is the estimated solution from prior information, $\alpha$ is the regularization factor, and $\alpha\|I(p-\hat{p})\|^2$ represents a constraint. Choosing $\hat{p}$ as 0 and I as an identity matrix yields the standard Tikhonov solution (see "*Real-Time Monitoring of Pressure Distribution ...*" cited above), where the pressure distribution is expressed as:

$$\hat{p} = (S^T S \alpha I)^{-1} + S^T \lambda \hat{p} = (S^T S \alpha I)^{-1} S^T \lambda \quad (6)$$

The sensitivity matrix can be either calculated in a numerical model or measured in experiments. In both cases, the capacitance of all sensing capacitors are measured or calculated by forcing the kth pressure as "1" while the rest as "0":

$$\begin{cases} p_i = 1, & \text{when } i = k \\ p_i = 0, & \text{when } i = 1, 2, \ldots, k-1, k-1, \ldots +M \end{cases} \quad (7)$$

Figures 5A, 5B:
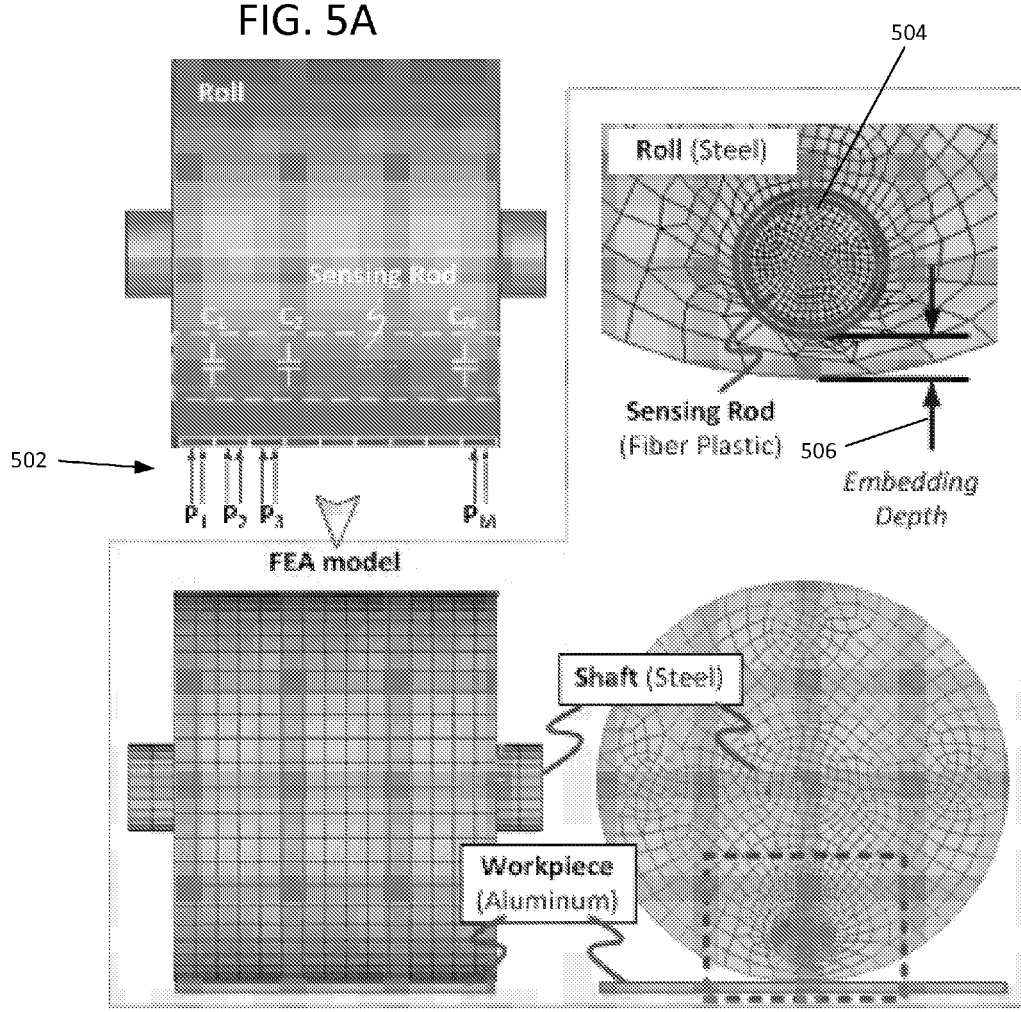
FIG. 5A illustrates a side view of a roller/transducer.
FIG. 5B is a diagram that illustrates an analysis of the roller/transducer of FIG. 5A using numerical methods (e.g., finite element analysis).

In the presented study, the sensitivity matrix is calculated numerically, as shown in FIG. 5. The sensing area on the roll surface was divided into 30 unit regions 502 (M=30). The simulated sensing rod 504 being installed with an embedding depth 506 of 2 mm, is 36 mm long and has a diameter of 9.8 mm. The width of the electrodes is 7 mm. Four of these electrodes (N=4) are evenly distributed along the roll. From Eq. (3), it is seen that the sensitivity matrix has a dimension of 4×30. Each row of this matrix is calculated in the simulation model, and plotted in FIG. 6.

Figure 6:
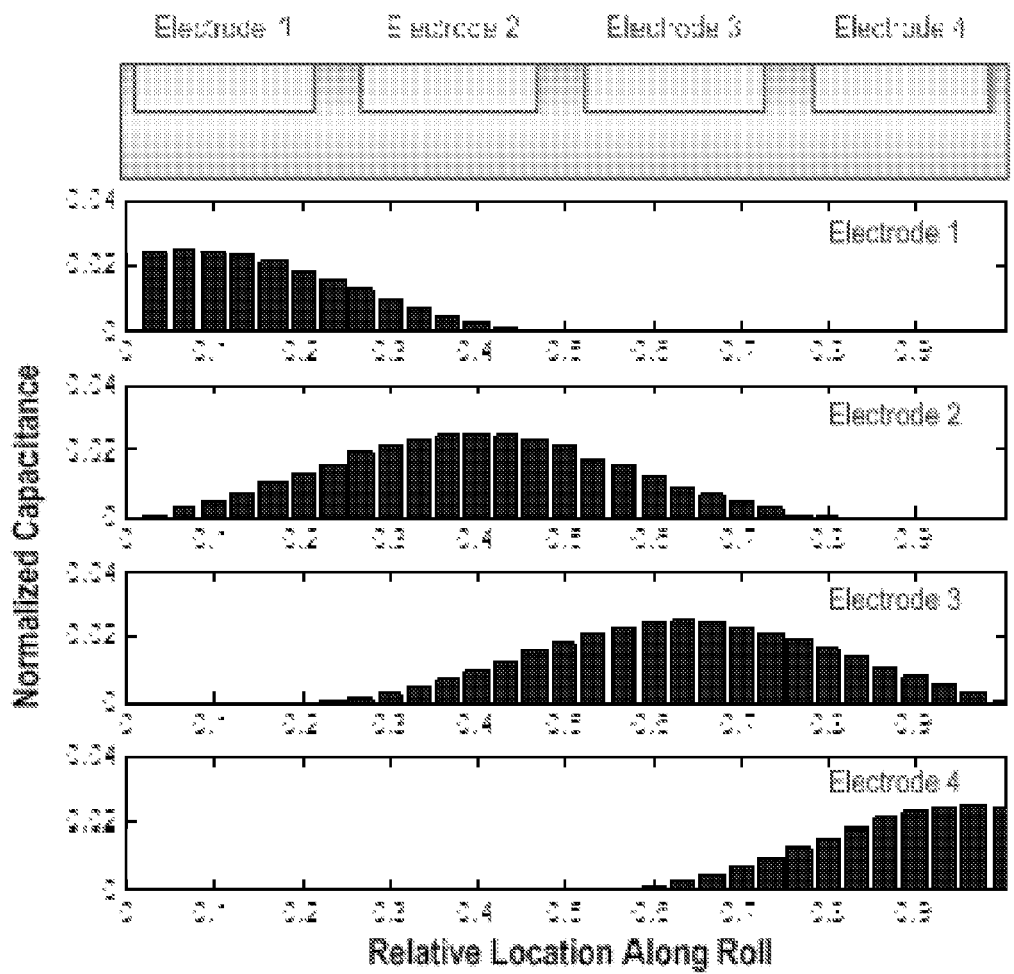
FIG. 6 includes multiple bar graphs representing sensitivity of sensor electrodes constructed and arranged according to the described embodiments.

Each bar graph section of FIG. 6 represents the sensitivity of a given capacitor responding to a unit pressure at different locations along the roll. As the roll is a continuous body in which the deformation induced by localized pressure propagates to the nearby region, the sensing region of each capacitor along the roll is wider than the electrode width. This effect indicates that a higher number of electrodes increases the spatial resolution for pressure reconstruction. On the other hand, a higher number of electrodes produces lower capacitance values on each capacitor, resulting in a lower signal-to-noise (S/N) ratio in the measurement. The number of electrodes thus may be optimized according to at least these two factors.

Figure 7:
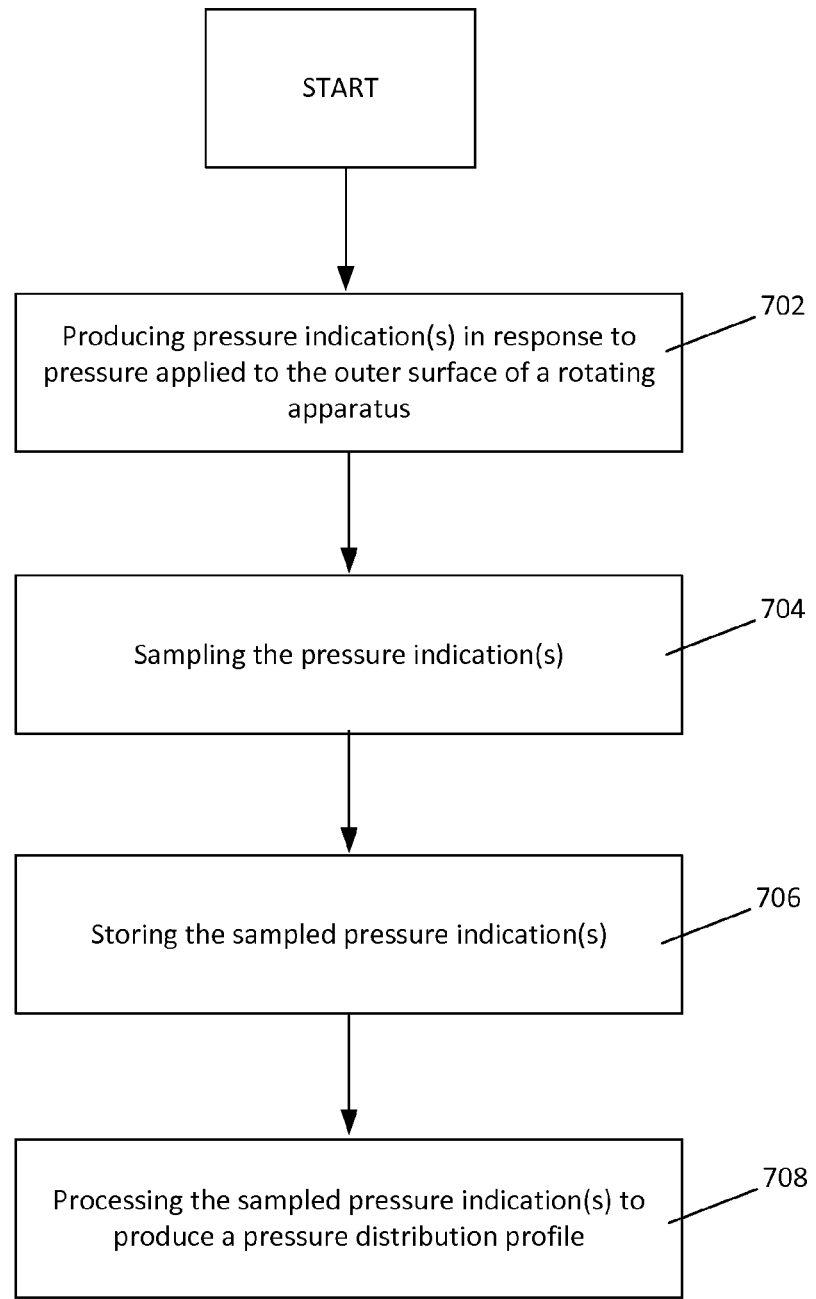
FIG. 7 is a flow diagram of an example of an embedded sensing method according to the described embodiments.

FIG. 7 illustrates a flow diagram of an example of an embedded sensing method according to the described embodiments. A transducer assembly embedded within a rotating device or tool produces 702 one or more pressure indications in response to pressure applied to an outer surface of the rotating device or tool. An acquisition assembly samples 704 the one or more pressure indications, and stores 706 the sampled pressure indications. The method further includes processing 708 the sampled pressure indications to produce a pressure distribution profile.

Embodiments of the disclosed method may balance the two above-described factors for optimum monitoring effectiveness for particular operating parameters of a given process and/or to optimize monitoring for required specifications of a given product or workpiece.

Embodiments of the disclosed example method and apparatus may further optimize and improve the method and/or apparatus using methods and approaches known to those skilled in the art pertaining to the general field of the disclosed technology by one or more of the following: characterization of sensor behavior; systematic testing on one or more examples of a microrolling mill; obtaining data from the above characterization and testing to develop a comprehensive and quantitative database on the relationship among various parameters, e.g., material, feature dimension, initial thickness of the sheet metal for microrolling, roll rotation speed/feed rate, effect of electromagnetic field on sensor performance, etc.

Another embodiment of the disclosed invention applies such data to improve sensor design and/or to improve the location and positioning of the sensor in an apparatus to optimize effectiveness of microrolling equipment and methods.

Disclosed herein is a new sensing method for real-time continuous pressure measurement across a rotating roll that has been developed and experimentally evaluated on a micro-rolling mill. The sensor may measure the deformation within the roll structure via a series of capacitive sensing elements, without direct contact with the workpiece, and may retrieve the pressure distribution based on the Tikhonov Regularization method.

The effectiveness of the disclosed sensing method has been verified by the depth of channels formed on the surface of the workpiece. Besides micro-rolling, the embedded sensing method and related apparatus designs can be adapted to a wide range of applications where pressure distribution on rotating tools and workpieces can be remotely retrieved for improved process monitoring and controls.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks While this invention has been particularly shown and described with references to example embodiments thereof, it will be understood by those skilled in the art that various changes in form and details may be made therein without departing from the scope of the invention encompassed by the appended claims.

What is claimed is:

1. An apparatus configured to rotate, comprising:
    a geometric shape disposed about a first longitudinal axis, the geometric shape having a first end, a second end, and an outer surface at a radius r from the longitudinal axis, the geometric shape defining at least one void therein, the at least one void disposed along a second longitudinal axis that is (i) substantially parallel to the first longitudinal axis and (ii) situated between the first longitudinal axis and the outer surface, the at least one void not intersecting the outer surface; and
    a transducer assembly disposed within the at least one void, the transducer assembly including at least one transducer element constructed and arranged to produce an indication corresponding to pressure distribution applied along the outer surface of the geometric shape.

2. The apparatus of claim 1, wherein the geometric shape is substantially cylindrical.

3. The apparatus of claim 1, wherein the at least one transducer element includes a capacitive transducer having a first conductor and a second conductor.

4. The apparatus of claim 3, further including a dielectric material disposed between the first conductor and the second conductor.

5. The apparatus of claim 3, wherein a distance between the first conductor and the second conductor changes in response to pressure applied to the outer surface.

6. The apparatus of claim 1, wherein the outer surface includes a plurality of sections from the first end to the second end, each section including a corresponding transducer element, the plurality of sections being used to produce a spatial and temporal pressure distribution profile.

7. The apparatus of claim 1, wherein the transducer assembly further includes a transmitter configured to convey the indication from the apparatus.

8. The apparatus of claim 7, wherein the transmitter is a wireless transmitter.

9. A system for measuring pressure experienced by a rotating apparatus, comprising:
    a roller disposed about a first longitudinal axis, the roller having a first end and a second end, and an outer surface at a radius r from the longitudinal axis, the roller defining at least one void therein, the at least one void disposed at a distance d from the outer surface and along a second longitudinal axis that is (i) substantially parallel to the first longitudinal axis and (ii) situated between the first longitudinal axis and the outer surface;
    a transducer assembly disposed within the at least one void, the transducer assembly including at least one transducer element constructed and arranged to produce an indication corresponding to pressure distribution applied along the outer surface of the roller; and
    a data acquisition module constructed and arranged to receive the indication from the at least one transducer element and to transform the indication into a value corresponding to pressure applied to the outer surface.

10. The apparatus of claim 9, wherein the at least one transducer element includes a capacitive sensor having a first conductor and a second conductor.

11. The system of claim 9, wherein the indication is a capacitance, the data acquisition module converts the capacitance to a voltage, and the data acquisition module samples the voltage to produce the indication.

12. The apparatus of claim 9, wherein the transducer assembly further includes a wireless transmitter configured to transmit the indication from the apparatus.

13. The system of claim 9, wherein the data acquisition module provides an excitation signal to the one or more transducer elements to determine a characteristic of the one or more transducer elements.

14. The system of claim 13, wherein the characteristic is a capacitance value.

15. The system of claim 9, wherein the outer surface consists of a plurality of sections from the first end to the second end, each section having a corresponding sensor element.

16. The system of claim 9, wherein the data acquisition module uses back-projection to transform the indication into a spatial and temporal pressure distribution profile corresponding to pressure applied to the outer surface from the first end to the second end.

17. A method of determining a spatial and temporal pressure distribution profile on an outer surface of a rotating apparatus disposed about a first axis, comprising:
    producing, by a transducer assembly embedded within the rotating apparatus at a distance d from the outer surface of the rotating apparatus, two or more pressure indications along the outer surface parallel to the first axis in response to pressure distribution applied along the outer surface of the rotating apparatus;
    sampling, by an acquisition assembly, the two or more pressure indications from the transducer assembly and storing the sampled two or more pressure indications; and
    processing the two or more pressure indications to produce the pressure distribution profile describing the pressure applied to the outer surface.

18. The method of claim 17, the processing further includes back-projecting the one or more pressure indications to calculate the pressure distribution profile.

19. The method of claim 17, further including converting the one or more pressure indications into an alternative physical parameter.

20. The method of claim 17, wherein the acquisition assembly is collocated with the rotating apparatus.

* * * * *